(12) United States Patent
Chiang et al.

(10) Patent No.: US 6,672,796 B2
(45) Date of Patent: Jan. 6, 2004

(54) FASTENING MECHANISM FOR DETACHABLE KEYBOARD MODULES

(75) Inventors: Chih-Hsiang Chiang, Chung Li (TW); Wang Chih Wei, Shulin (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/981,798

(22) Filed: Oct. 19, 2001

(65) Prior Publication Data
US 2002/0048155 A1 Apr. 25, 2002

(30) Foreign Application Priority Data

Oct. 23, 2000 (TW) .................................... 89218415 U

(51) Int. Cl.[7] ............................................... G06F 1/16
(52) U.S. Cl. ........................................ 403/327; 361/680
(58) Field of Search ................................. 361/680, 747, 361/681–683, 686; 400/692, 682; 403/327, 326, 331

(56) References Cited

U.S. PATENT DOCUMENTS

| | | | | |
|---|---|---|---|---|
| 5,229,757 A | * | 7/1993 | Takamiya et al. | 345/168 |
| 5,510,953 A | * | 4/1996 | Merkel | 361/680 |
| 5,642,257 A | * | 6/1997 | Saito et al. | 361/680 |
| 6,212,066 B1 | * | 4/2001 | Fetterman | 361/680 |
| 6,379,062 B1 | * | 4/2002 | Chiang | 400/495 |
| 6,493,215 B1 | * | 12/2002 | Chiang et al. | 361/680 |

FOREIGN PATENT DOCUMENTS

EP  761126 A1 * 3/1997 ........... A47B/21/03

\* cited by examiner

*Primary Examiner*—James R. Brittain
(74) *Attorney, Agent, or Firm*—Troxell Law Office PLLC

(57) ABSTRACT

A fastening mechanism for detachable keyboard modules with the keyboard module consists of at least one fastening seat. The fastening seat engages with a fastening means. The keyboard module is fastened to a computer casing through the fastening means. The fastening means includes a body, two slide channels and an elastic element. The body has a second fastener located at a front end and a housing chamber located at a rear end. The two slide-channels are located at two sides of the body to form a slidable coupling with two slides which located at two sides of the fastening seat. The elastic element is restricted between the housing chamber and a stopping flange which located at a rear end of the fastening seat. The elastic force of the elastic element may push the fastening means forwards to enable a second fastener located at the front end of the body to engage with a first fastener located at the computer casing thereby to enable the keyboard module fastening to the computer casing. When the fastening means is moved rearwards, the second fastener is separated from the first fastener thereby enabling the keyboard module detached from the computer casing.

18 Claims, 22 Drawing Sheets

FASTENING MECHANISM FOR DETACHABLE KEYBOARD MODULES

FIELD OF THE INVENTION

This invention relates to a fastening mechanism for detachable keyboard modules and particularly a fastening mechanism that enables a keyboard module to assemble on or detach from a computer casing easily.

BACKGROUND OF THE INVENTION

In notebook computers or smaller size computers and processors, the keyboard usually is fastened to the computer casing in a module fashion. The keyboard module may be detached from the computer casing for testing and repairs. The keyboard module generally is fastened to the computer casing by a plurality of button keys.

However, regard the methods for fastening the keyboard module to the computer casing, one of the conventional techniques is using screws to fasten the bottom of the notebook computer. The fastening process includes to dispose the keyboard module in a reserved space, use the upper lid which contains the display device to temporarily fix the keyboard module to prevent skewing, then turn the whole computer set up side down with the bottom side facing upward, finally screw and fasten the keyboard module from the bottom side. While such a fastening method can attain a secure bonding, the fastening and detaching processes are very much inconvenient. For assembling, disassembling or repairing the inner elements of the notebook computers (such as hard disk drive, central processor unit, and other interface cards), the keyboard module has to be removed first. It increases a lot of inconvenience to the repair work and needs more labor and time.

Referring to FIGS. 1A, 1B and 1C which show a second conventional fastening means for keyboard fastened in a notebook computer disclosed in R.O.C. patent publication No. 356257. The fastening means 20 consists of an upper lid 21, an anchor block 22, a spring 23 and a casing 24. The fastening means 20 is installed at blank key positions of keyboard module 10 (shown by A and B in FIG. 1A).

The upper lid 21 is a plank structure which has a T-shaped protruding 211 and a plurality of hooks 212 located at the bottom side thereof. The anchor block 22 has a T-shaped cavity 221 and a plurality of latch cavities 222 mating respectively against the T-shaped protruding 211 and hooks 212. The anchor block 22 further has symmetrical lugs 223 located at two lateral sides thereof. The spring 23 engages with one end of the anchor block 22. The casing 24 is located on the base of the keyboard module 10 at the blank key position. The front edge of the base has an opening 241 to enable the anchor block 22 to pass through. The two lateral sides of the casing 24 have respectively a L-shaped slot 242 to engage with the lugs 223 of the anchor block. There is a round stub 243 located at the rear side of the casing for holding the spring 23.

For assembly, disposing the anchor block 22 in the casing 24 with the lugs 223 at two sides slipping into the L-shaped slots 242 of the casing 24, and with the front section of the anchor block 22 extended outwards through the opening 241 of the casing 24. The spring 23 is located and compressed between the rear end of the anchor block 22 and the round stub 243 of the casing 24. Then fasten the upper lid 21 to the anchor block 22 by engaging the T-shaped protruding 211 with the T-shaped cavity 221, and engaging the hooks 212 with the latch cavities 222. The upper lid 21 thus may fasten securely to the anchor block 22 for controlling the movement of the anchor block 22. When the keyboard module 10 is fastened to the computer casing, the spring 23 pushes the front end of the anchor block 22 outwards through the opening 241 for engaging with a snap edge of the computer casing (as shown in FIG. 2). Push the upper lid 21 rearward, the anchor block 22 will be withdrawn into the casing 24, then the keyboard module 10 may be detached and removed.

The keyboard fastening means depicted in the second conventional technique set forth above also has disadvantages. For instance, the assembly and molding are quite difficult. As a result, design and fabrication costs are much higher. In order to resolve the foregoing problems, many notebook computer manufacturers have invested a lot of research and development efforts trying to make improvement

SUMMARY OF THE INVENTION

It is a primary object of this invention to provide a fastening mechanism for detachable keyboard modules that is easy to assemble and enables the keyboard module to couple easily with the computer casing.

Another object of this invention is to provide a fastening mechanism for detachable keyboard modules that has a simplified component design such that molding becomes easier, thereby to reduce the costs of design and manufacturing.

The keyboard module according to this invention has at least one fastening seat. Each fastening seat has two sides which have respectively a slide and a closed end which has a stopping flange located thereon. A fastening means is provided to engage with a computer casing. The fastening means includes a body, two slide channels and an elastic element. The body has a front end which has a second fastener located thereon and a chamber located in the rear end. The two slide channels are located respectively at two sides of the body to engage with the slide at two sides of the fastening seat in a slidable manner. The elastic element is restricted between the chamber of the body and the stopping flange of the fastening seat.

When the keyboard module is mounted on the computer casing, the fastening means is pushed forwards by the elastic force of the elastic element such that the second fastener of the body engages with the first fastener of the computer casing to enable the keyboard module fastened to the computer casing. When the fastening means is moved to rearwards by an external force, the second fastener of the body will be moved away from the first fastener of the computer casing to enable the keyboard module be lifted from the computer casing and removed therefrom.

The assembly process of the fastening means and the keyboard module of this invention is relatively simple, and it is easy to fasten to and remove from the computer casing. As a result, operation convenience can be greatly improved. Furthermore, the design of the fastening means is also simpler which makes fabrication and molding easier. The design and manufacturing costs thus may be greatly reduced.

The invention, as well as its many advantages, may be further understood by the following detailed description and drawings. The drawings are only to serve for reference and illustrative purpose, and do not intend to limit the scope of the present invention.

DESCRIPTION OF THE PREFERRED EMBODIMENTS

Figure 1A:
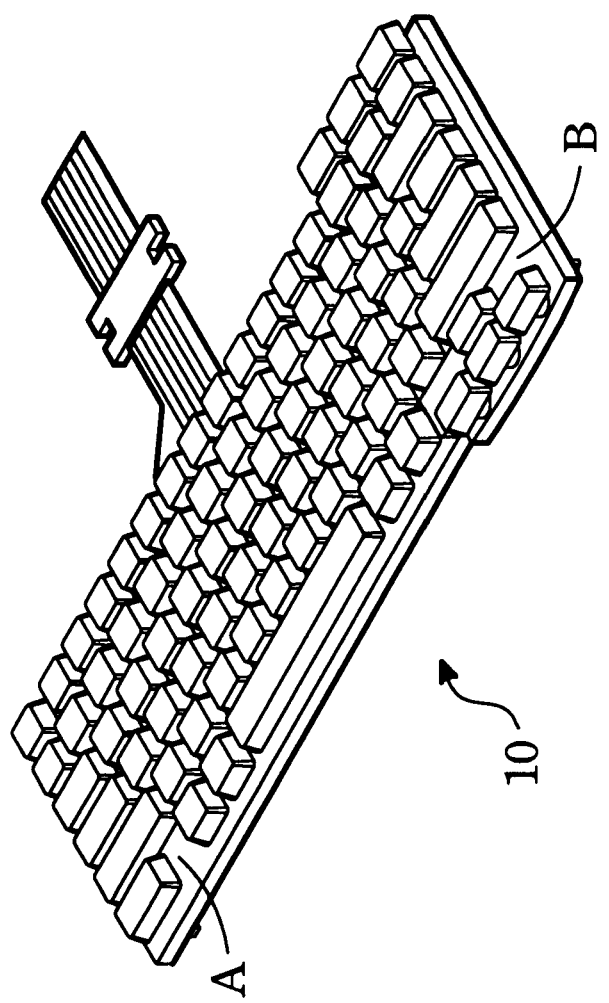
FIG. 1A is a schematic view of a keyboard module, adapting the second conventional technique.
Figure 1C:
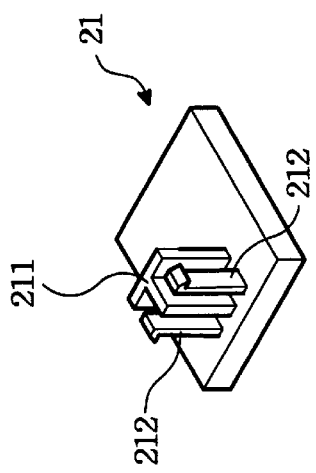
FIG. 1C is a perspective view of an upper lid, according to FIG. 1B.
Figure 1B:
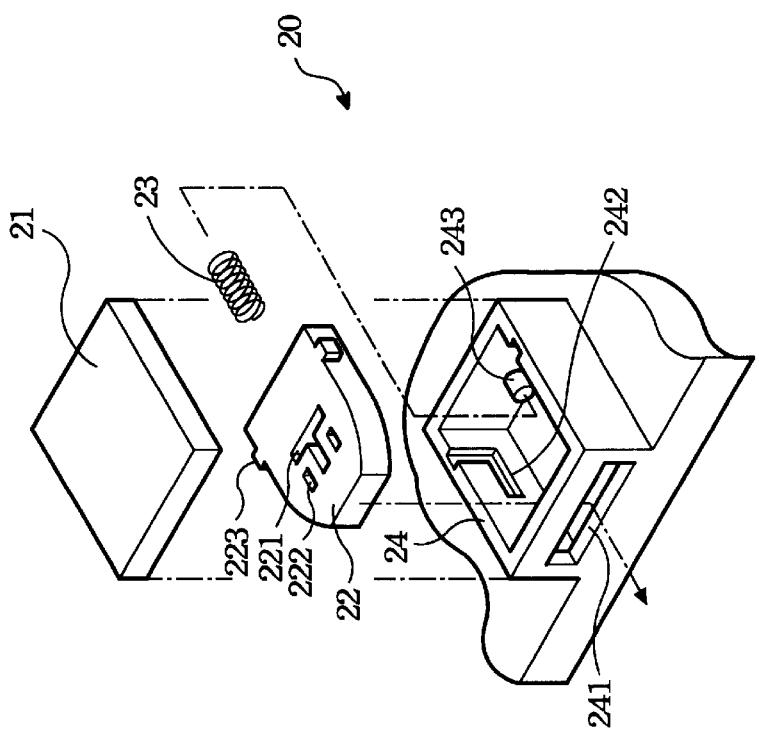
FIG. 1B is an exploded view of a fastening means, adapting the second conventional technique.
Figure 2:
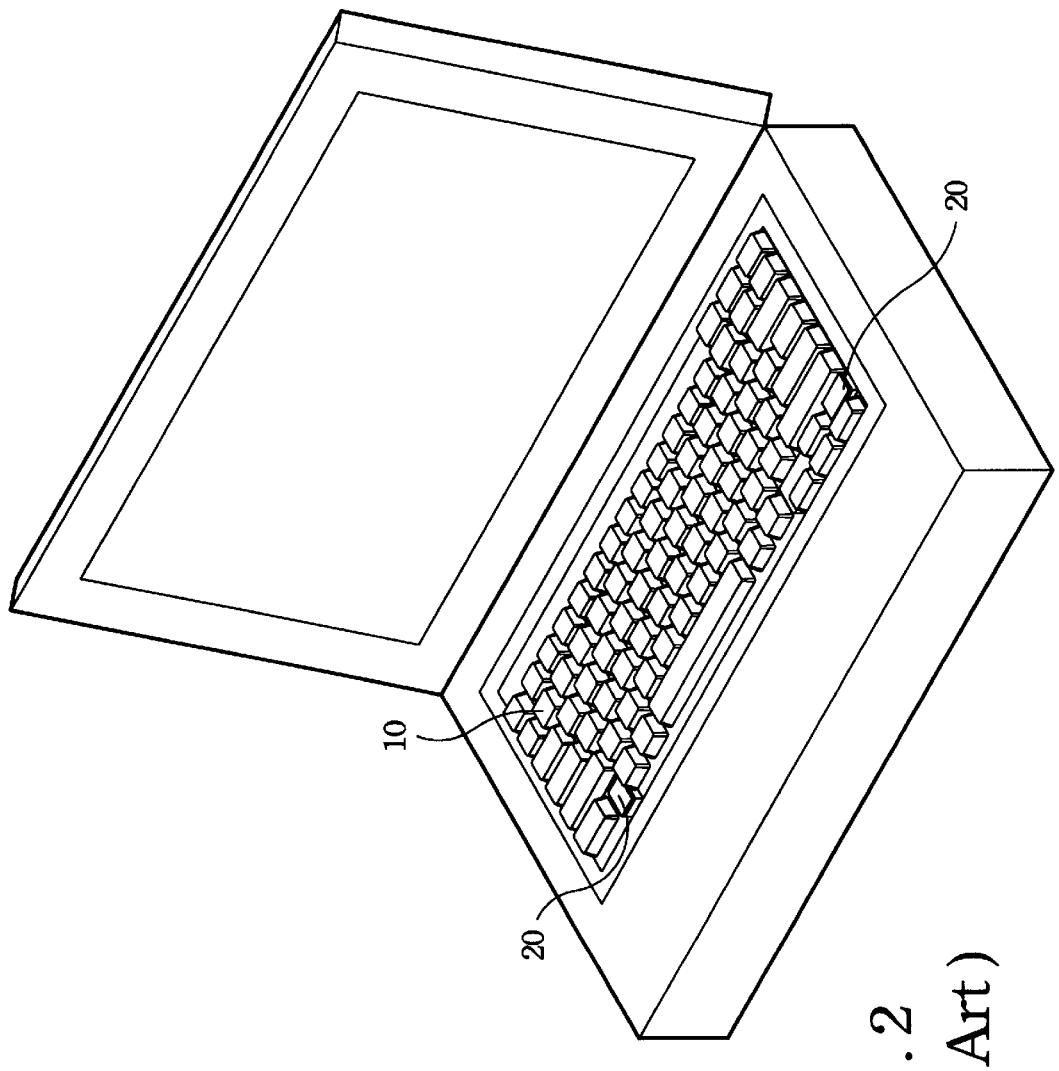
FIG. 2 is a schematic view of a keyboard module fastened to a computer casing, adapting the second conventional technique.
Figure 3A:
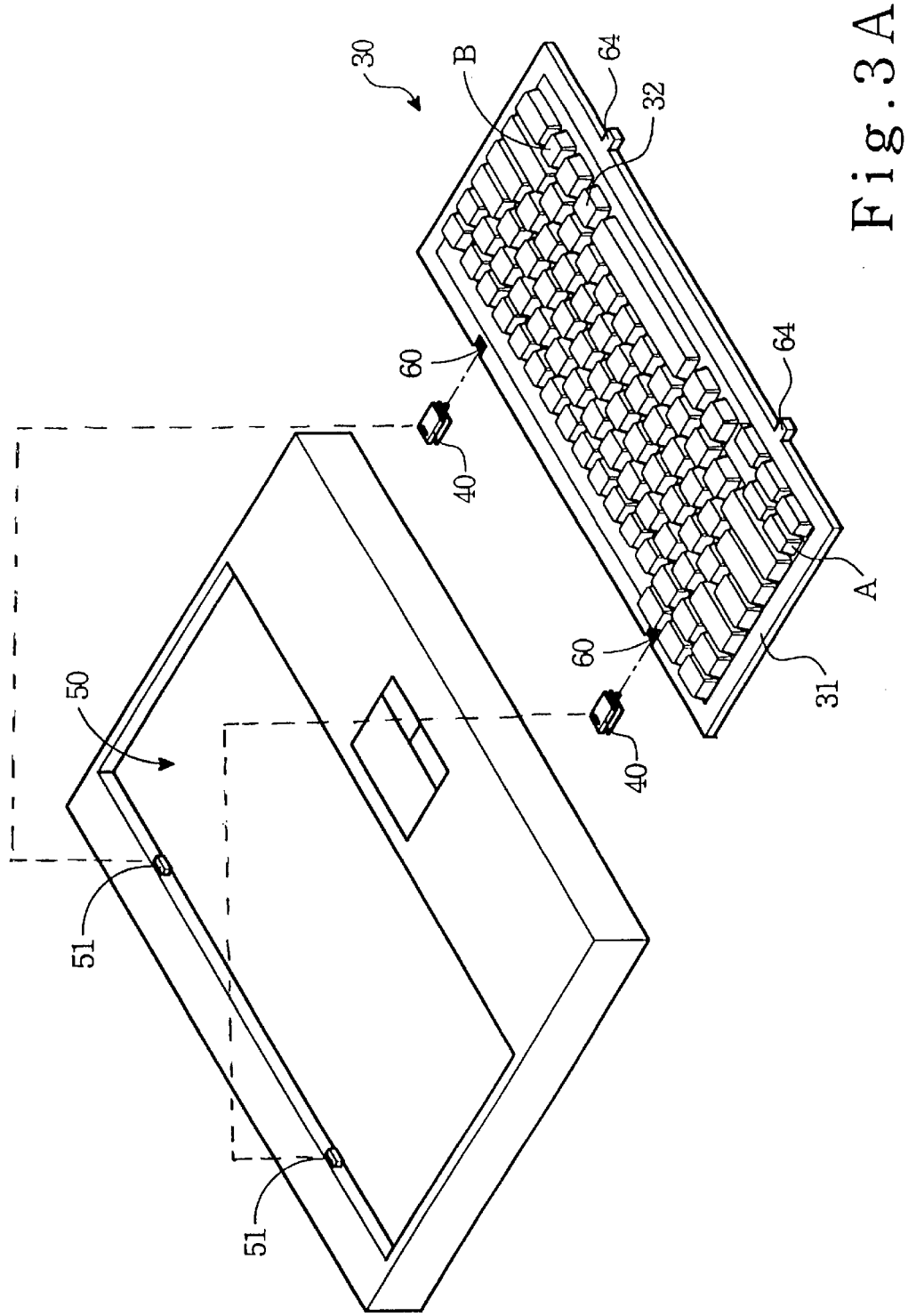
FIG. 3A is a schematic view of a keyboard module of this invention to be fastened to a computer casing through the fastening means.
Figure 3B:
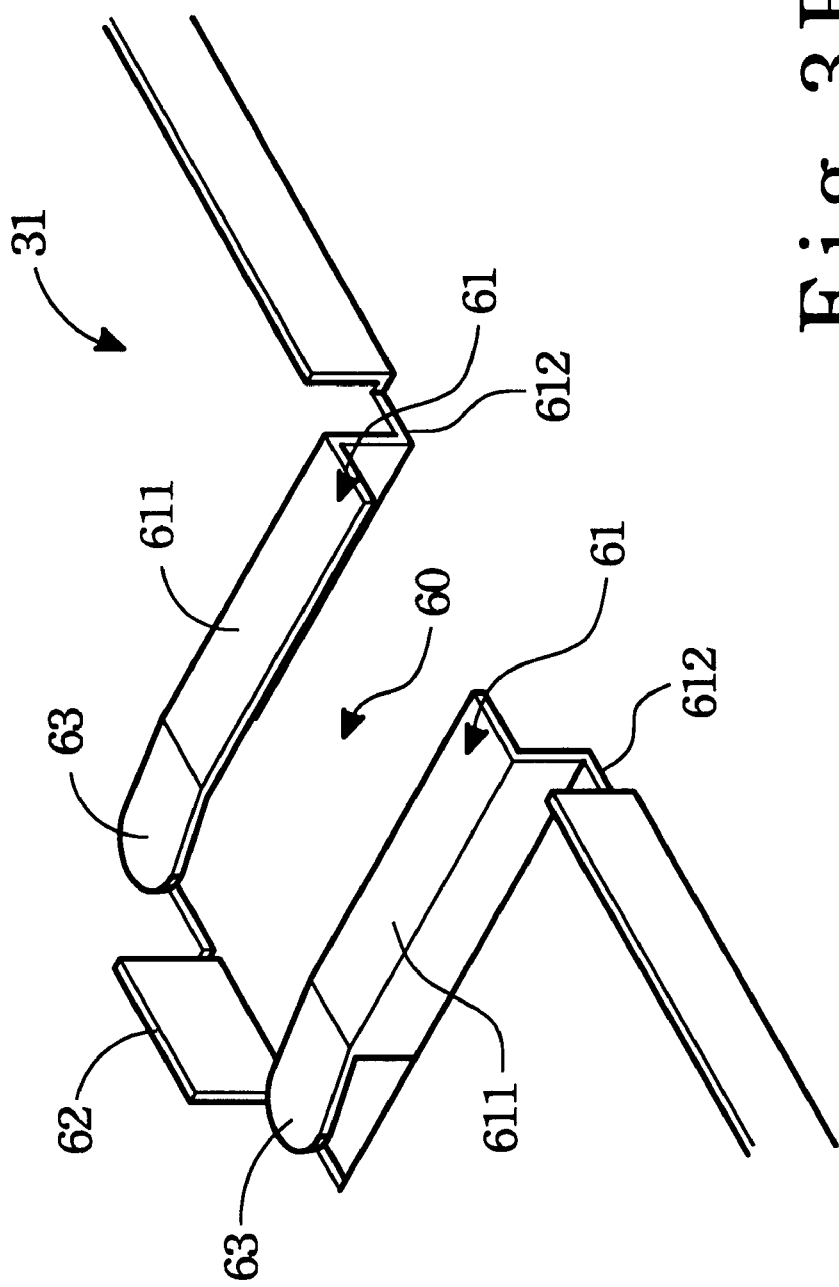
FIG. 3B is a perspective view of a fastening seat of the keyboard module of this invention.

Referring to FIGS. 3A and 3B, the keyboard module 30 according to this invention is assembled on and detached from a computer casing 50 by a fastening means 40. The keyboard module 30 is made by bonding a base 31 with a plurality of button keys 32 in a modular fashion. The base 31 is made of a metal material and has two fastening seats 60 located at the front end. Each fastening seat 60 has two slides 61 located at two sides and a stopping flange 62 located at a closed end. The slide 61 has an upper surface 611 and a lower surface 612. The slide 61 and stopping flange 62 are formed by punching process. The slide 61 has a ramp section 63 at the rear end and being tilted downwards (as shown in FIG. 3B).

Figure 4A:
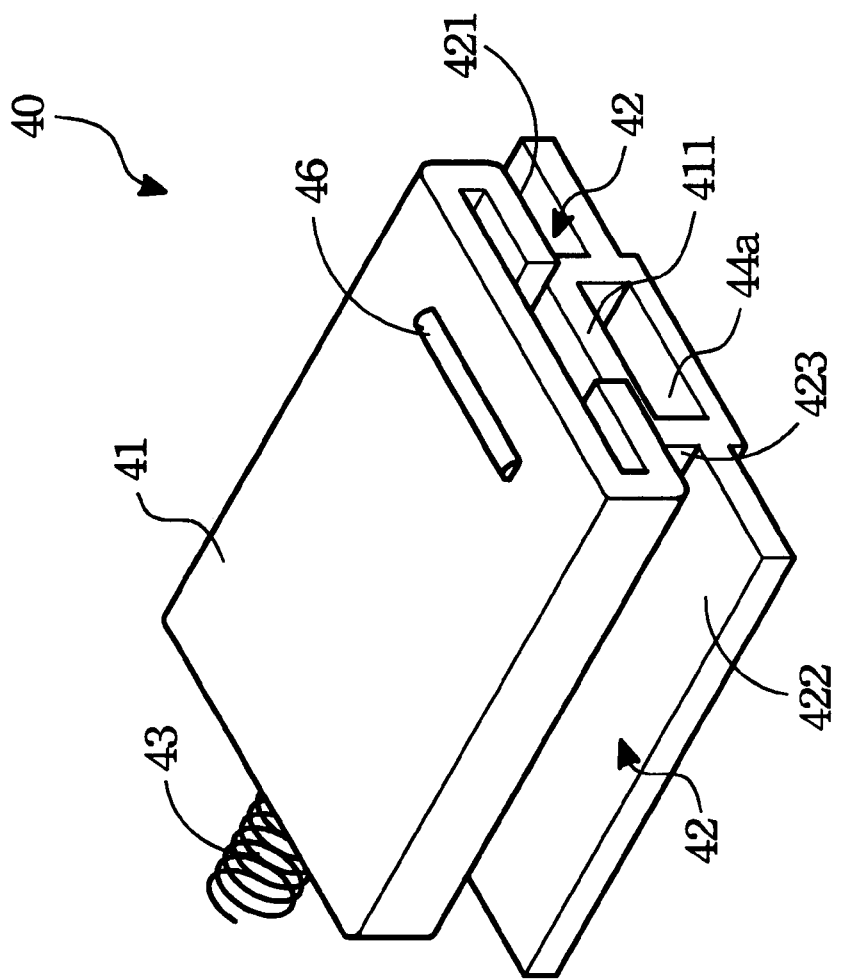
FIGS. 4A and 4B are schematic views of the first embodiment of the fastening mechanism of this invention.
Figure 4B:
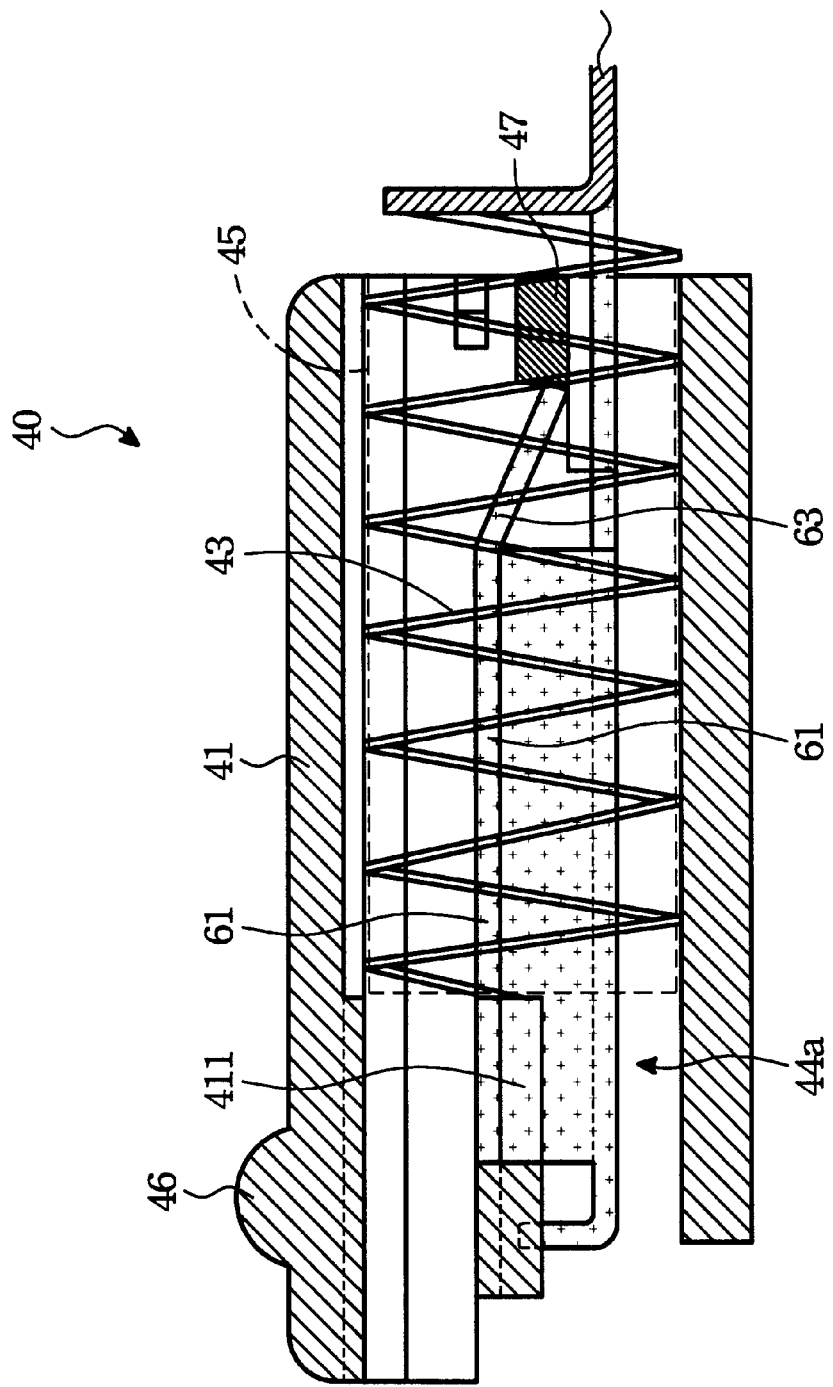

Referring to FIGS. 4A and 4B for a first embodiment of the fastening mechanism of this invention, the fastening means 40 includes a body 41, two slide-channels 42 and an elastic element 43. The body 41 has a front end which has a second fastener 44 (being a fastening trough 44a in this case) and a housing chamber 45 located at the rear end. There is a horizontal bulged ridge 46 formed on the upper surface of the body 41 and a front retainer 411 formed inside of the body. The fastening means 40 is made of plastic material and formed by injection forming process.

The two slide-channels 42 are located respectively at two sides of the body 41, each has a downward channel surface 421, an upward channel surface 422, and a side channel surface 423 to form respectively a slidable coupling with the two slides 61 of the keyboard module 30. The upper surface 611 of the fastening seat 60 contacts with the downward channel surface 421, and the lower surface 612 contacts with the upward channel surface 422. There is a rear retainer 47 formed at the rear end of the side channel surface 423 (also shown in FIG. 4B). When the fastening means 40 engages with the fastening seat 60 of the keyboard module 30, the slide-channels 42 slip into the rear end of the slides 61, and the rear retainers 47 of the slide-channels 42 are located behind the ramp sections 63 of the slides 61 so that the rear retainer 47 is blocked by the ramp section 63 thereby to prevent the fastening means 40 slipping away from the keyboard module 30.

The elastic element 43 is disposed between the housing chamber 45 of the fastening means 40 and the stopping flange 62 of the fastening seat 60. Firstly, the elastic element 43 is disposed in the housing chamber 45, and against the front retainer 411 of the housing chamber 45 with one end thereof. Then, the slide-channels 42 of the fastening means 40 are coupled with the slides 61 of the fastening seat 60, and make another end of the elastic element 43 pressing against the stopping flange 62 of the fastening seat 60, hence the elastic element 43 is restricted between the housing chamber 45 and the stopping flange 62. The elastic element 43 will be compressed and deformed when the fastening means 40 is pushed rearwards. When the compression force is released, the fastening means 40 will be moved forward by the elastic force of the elastic element 43.

Referring to FIG. 3A, in order to enable the keyboard module 30 fastening to the computer casing 50 smoothly, the computer casing 50 has a first fastener 51 (a protrusive key 51a in this embodiment) corresponding to the fastening means 40. The protrusive key 51a may engage with the fastening trough 44a of the fastening means 40 to enable the keyboard module 30 fastened securely to the computer casing 50. The keyboard module 30 may also have pseudo keys (such as A key and B key shown in the drawing) or extended lugs 64 at the sides without the fastening means 40 for engaging with notches (not shown in the drawing) formed in the computer casing 50. It is well known in the art and will be omitted here. The following description will be devoted to details of the fastening method for the keyboard module 30 engage with the computer casing 50 through the fastening means 40.

Figure 5A:
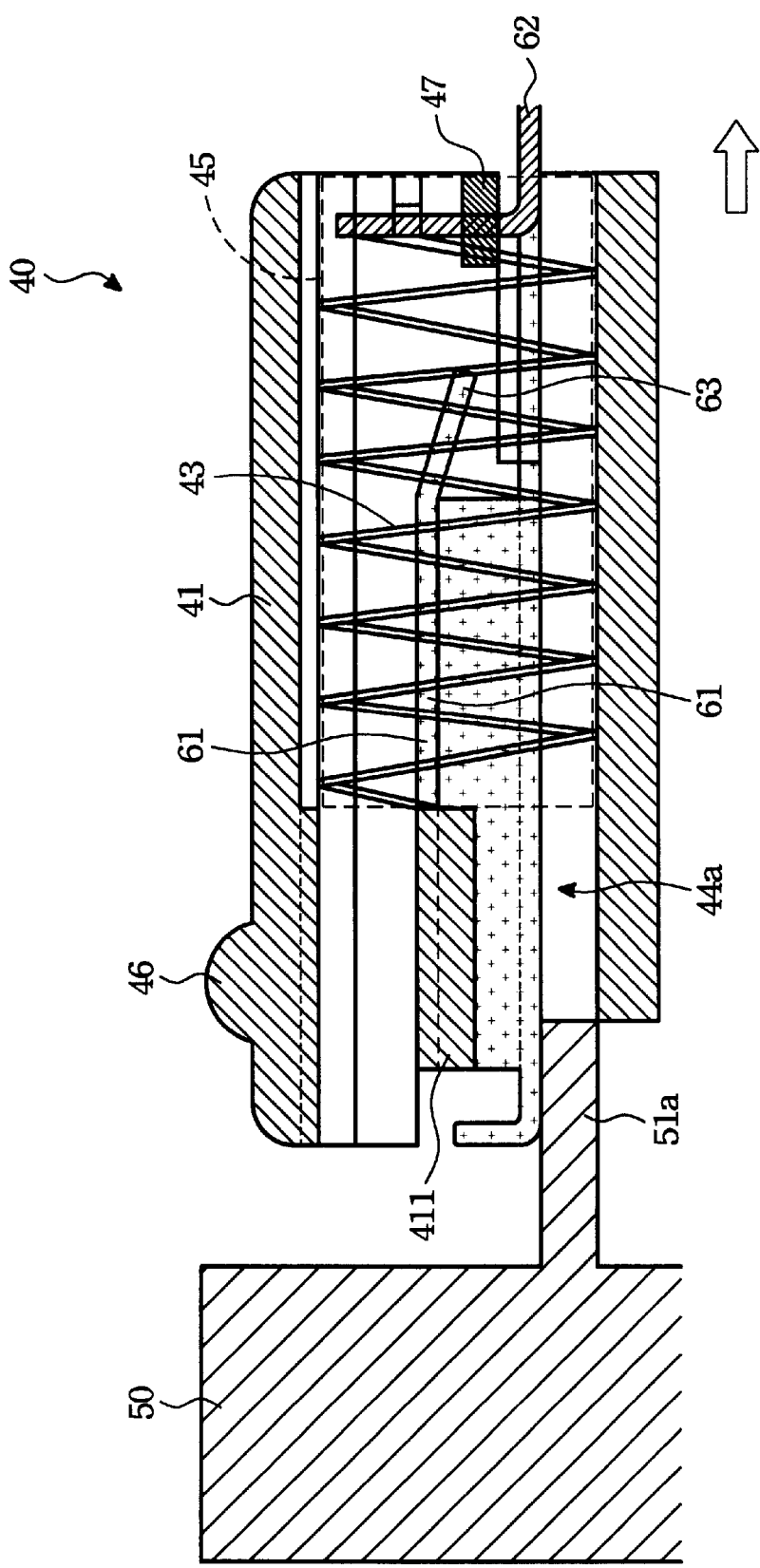
FIGS. 5A and 5B are schematic views of the first embodiment in action.
Figure 5B:
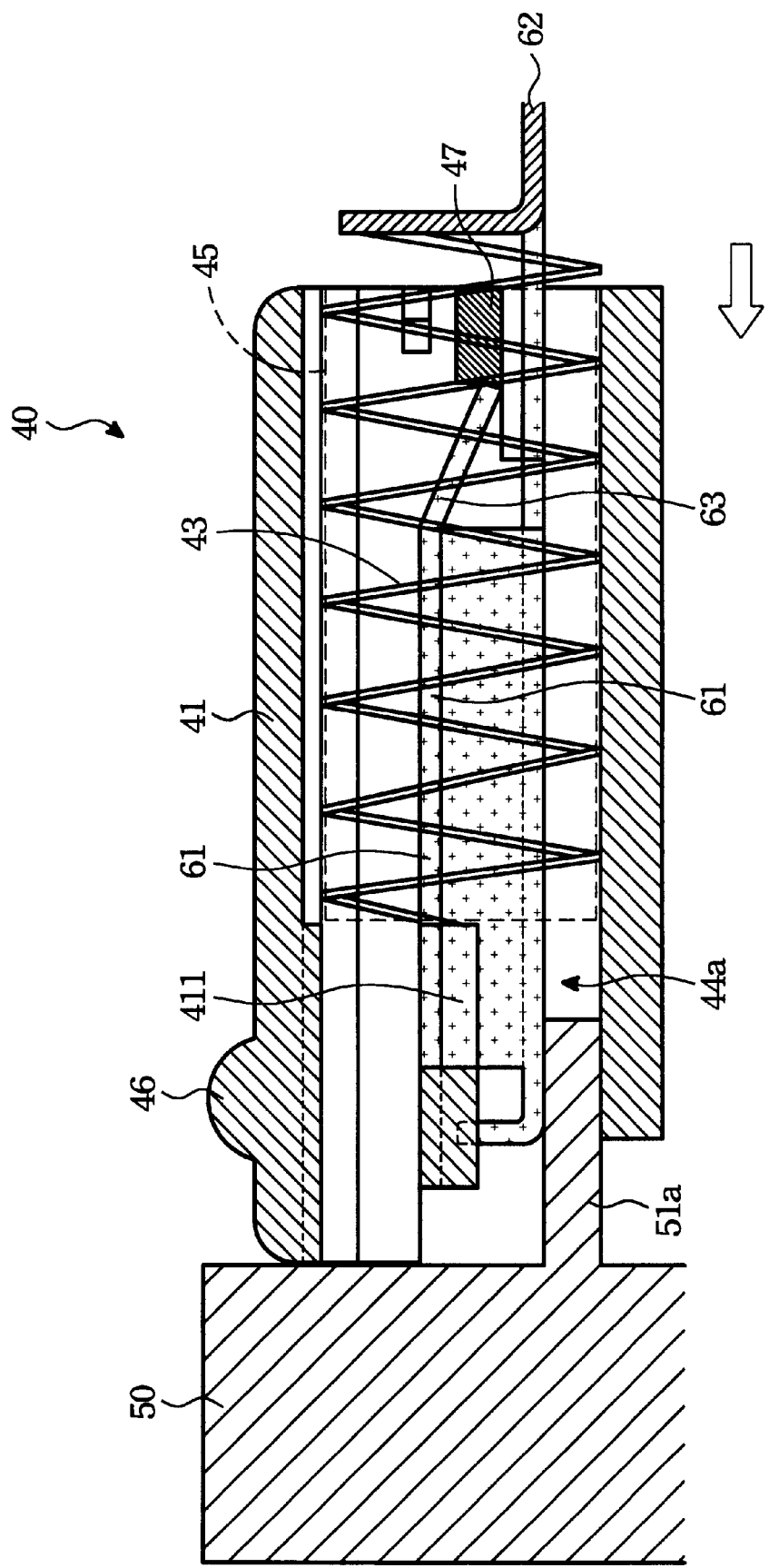

Referring to FIGS. 5A and 5B, when the keyboard module 30 is engaged with the computer casing 50, an user may hold the bulged ridge 46 by a finger (forefinger) to move the fastening means 40 rearwards for compressing and deforming the elastic element 43, then put the whole keyboard module 30 on the computer casing 50 to make the fastening trough 44a mating with the protrusive key 51a (as shown in FIG. 5A). Finally, releasing the bulged ridge 46, the fastening means 40 then is pushed toward the computer casing 50 by the elastic force of the elastic element 43, and the fastening trough 44a is engaged with the protrusive key 51a, thereby the keyboard module 30 will be fastened securely to the computer casing 50 (as shown in FIG. 5B). On the contrary, for detaching the keyboard module 30 from the computer casing 50, the user may hold the bulged ridge 46 by finger (forefinger) and move the fastening means 40 toward the stopping flange 62 for separating the protrusive key 51a from the fastening trough 44a, then the keyboard module 30 may be removed from the computer casing 50 easily.

Figure 6:
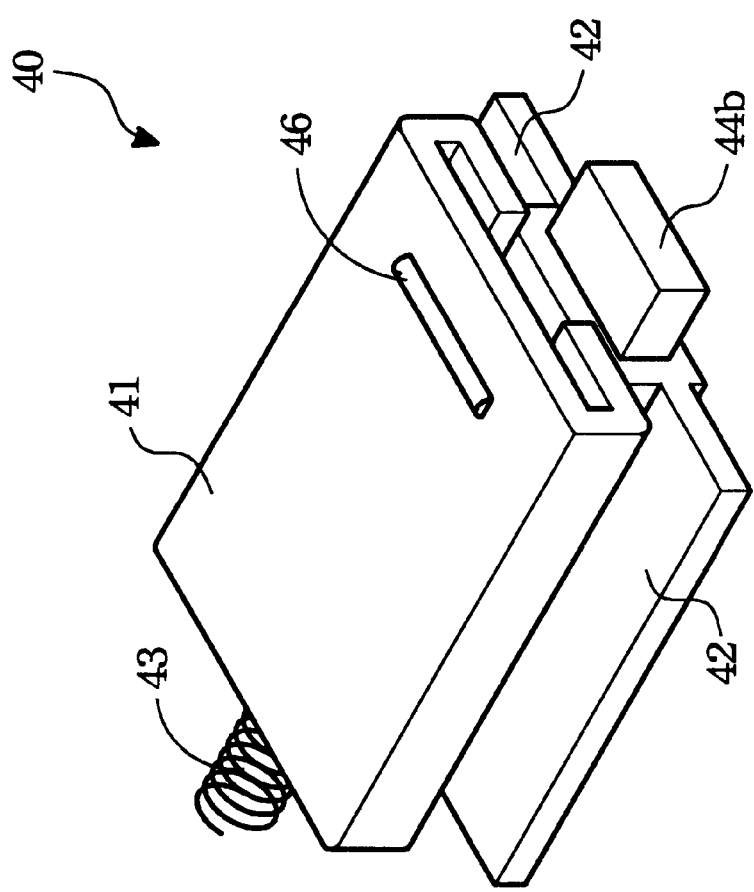
FIG. 6 is a perspective view of a second embodiment of the fastening mechanism.

FIG. 6 shows a second embodiment of this invention in which the fastening means 40 is largely shaped like the one shown in the first embodiment. The main difference is that there is a protrusive key 44b located at the front end of the second fastener 44, and the computer casing 50 has a fastening trough 51b (not shown in the drawing) located at the first fastener 51 corresponding to and engageable with the protrusive key 44b. The method of assembling and detaching the keyboard module 30 with the computer casing 50 is same as the first embodiment and will be omitted here.

Figure 7A:
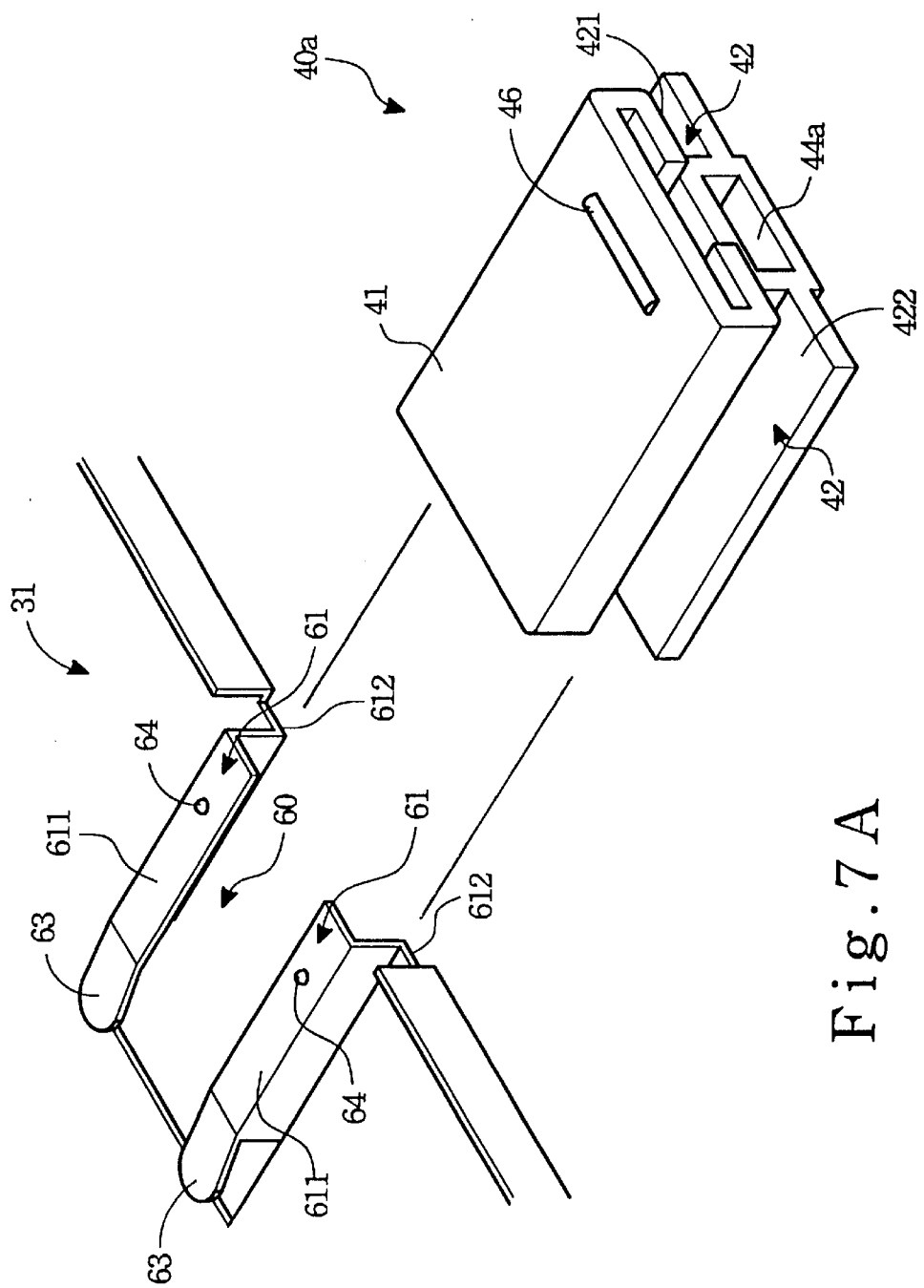
FIGS. 7A through 7F are schematic views of the third embodiment of the fastening mechanism.

FIG. 7A shows a third embodiment of this invention. While the first and second embodiment have an elastic element 43 in the fastening means 40 to provide elastic force for pushing the fastening means 40 to engage with the computer casing 50. However, the third embodiment offers a fastening means 40a without the elastic element 43. More details will be depicted as follow.

In this embodiment (FIGS. 7A–8F), the fastening means 40a includes a body 41 with two slide-channels 42. The body 41 has a front end which has a second fastener 44 (a fastening trough 44a in this case). The slide-channels 42 are located respectively at two sides of the body 41. Each of the downward channel surface 421 and the upward channel surface 422 is connected with the upper surface 611 and lower surface 612 of the fastening seat 60 in a slidable manner.

Additionally, in order to prevent the slide channels 42 of the fastening means 40a from sliding freely on the slides 61 of the fastening seat 60 and cause the fastening means 40a could not be fastened securely to the keyboard module 30, there is a third fastener 64 formed on the slide 61 by punching process. The surface of the slide-channel 42 has a fourth fastener 4211 and a fifth fastener 4212 formed thereon to mate against the third fastener 64. The third fastener 64 may slide between the fourth fastener 4211 and fifth fastener 4212, and to engage selectively with one of them for preventing the fastening means 40a from disengaging with the fastening seat 60. The third fastener is a bulged or a dented spot formed on the surface of the upper surface 611. The fourth and fifth fasteners are dented or bulged spots formed on the downward channel surface 421 mating against the third fastener 64. Of course, the third fastener 64 may also be a bulged or a dented spot located on the lower surface 612, and the fourth and fifth fastener 4211 and 4212 are the dented or bulged spots located on the upward channel surface 422 mating against the third fastener 64.

Furthermore, the third fastener may also be disposed on the surface of the slide-channel 42, and the fourth and fifth fasteners are disposed on the mating surface of the slide 61. The design is substantially same as the one set forth above, thus will be omitted here.

In this embodiment, the third fastener is a bulged spot 64 located at the upper surface 611 of the slide 61, and the fourth and fifth fasteners are the first dented spot 4211 and the second dented spot 4212 located at the downward channel surface 421. When the bulged spot 64 engages with the second dented pot 4212, the fastening trough 44a at the front end of the body 41 will be engaged with the protrusive key 51b of the computer casing 50 thereby the keyboard module 30 can be fastened to the computer casing 50. When the bulged spot 64 engages with the first dented spot 4211, the fastening trough 44a will be moved away from the protrusive key 51a, and then the keyboard module 30 may be separated from the computer casing 50. In order to reinforce the bonding strength between the fastening means 40a and fastening seat 60, there is a rear retainer 47 located at the rear end of the side channel surface 423 of the slide-channel 42, and block the rear retainer 47 is blocked by the tilted ramp section 63 of the slide 61 when the slide-channels 42 is slipped into the rear end of the slide 61. The fastening means 40a will be prevented from slipping away.

Figure 7B:
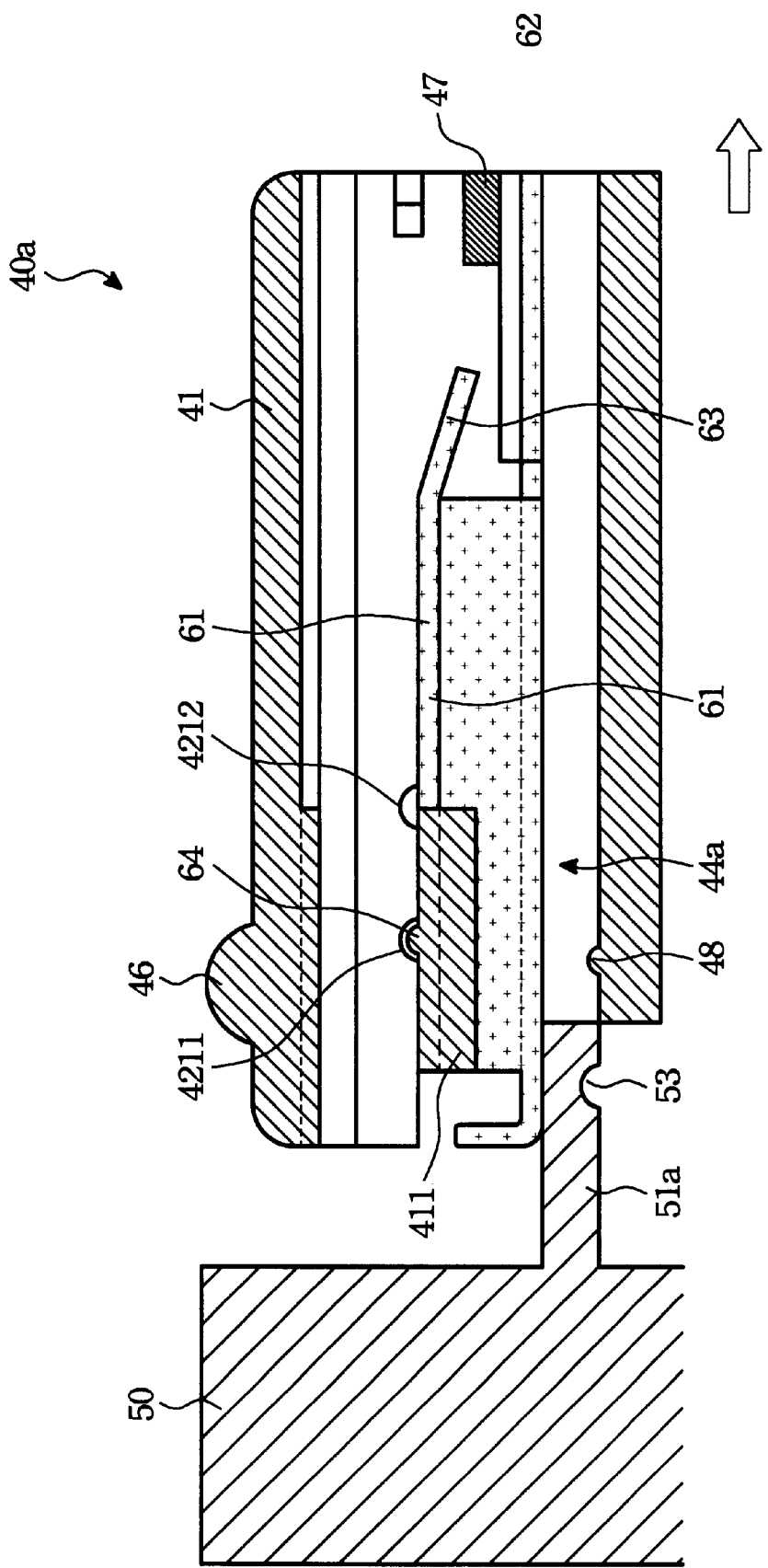
Figure 7C:
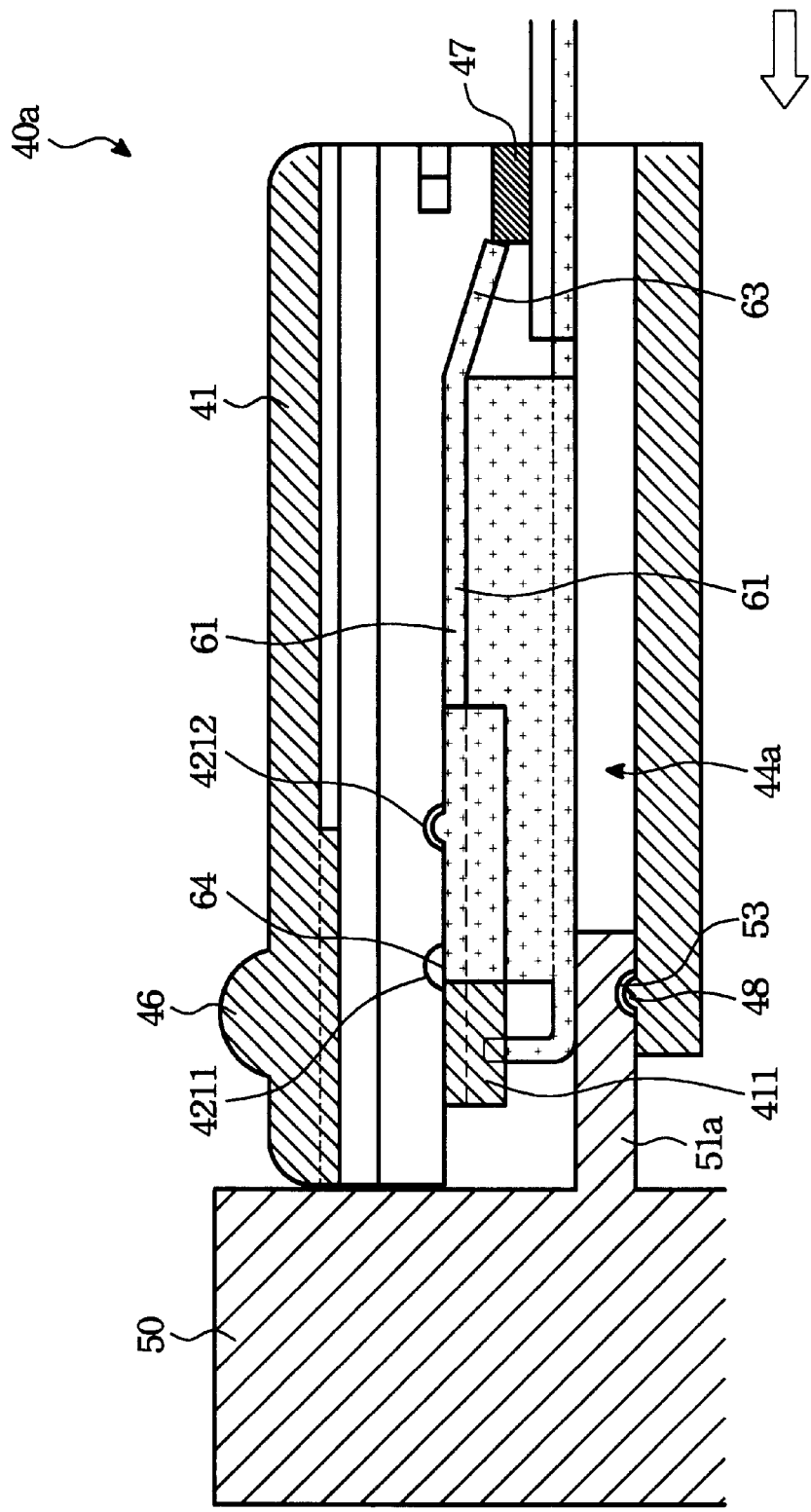
Figure 7D:
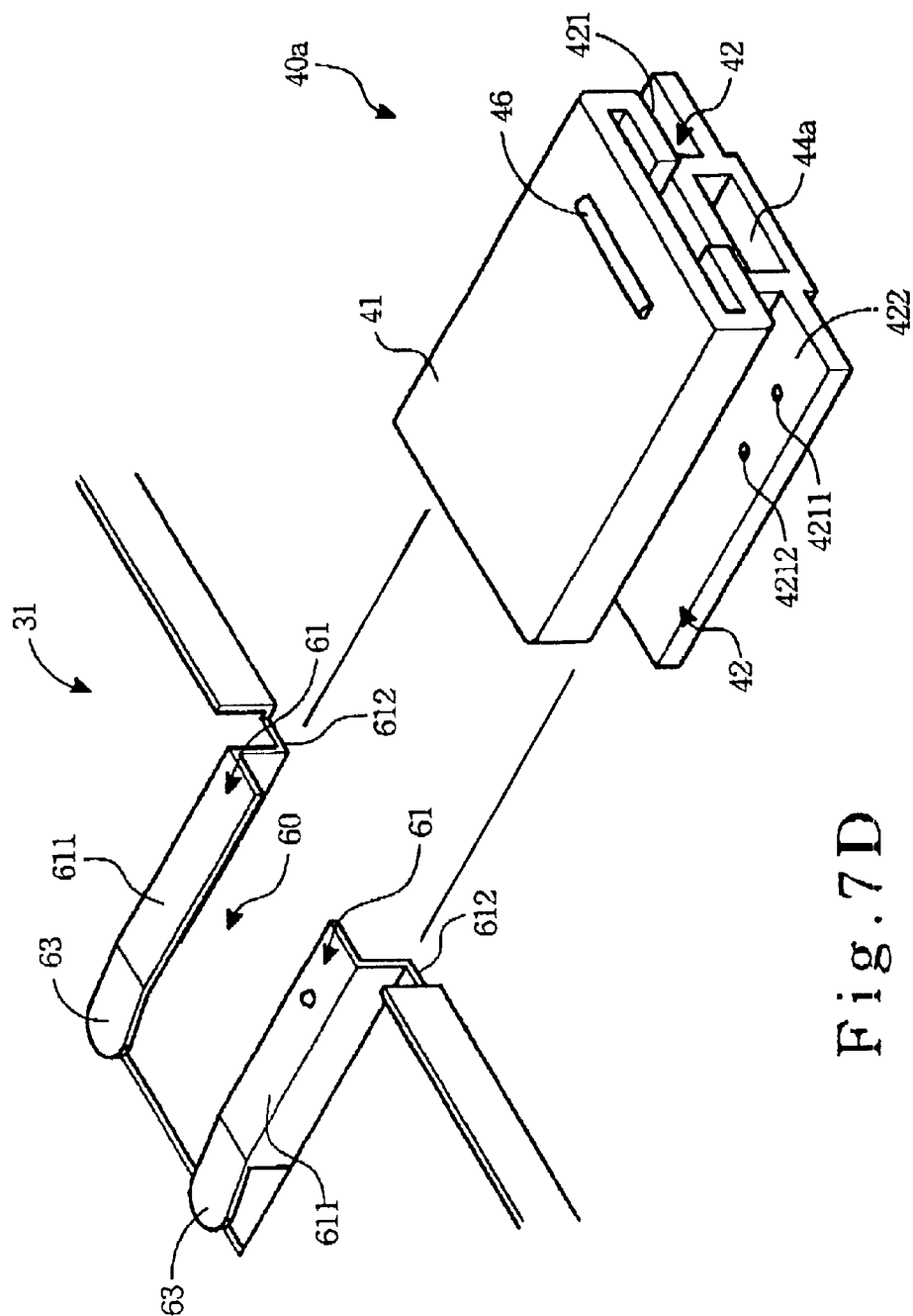
Figure 7E:
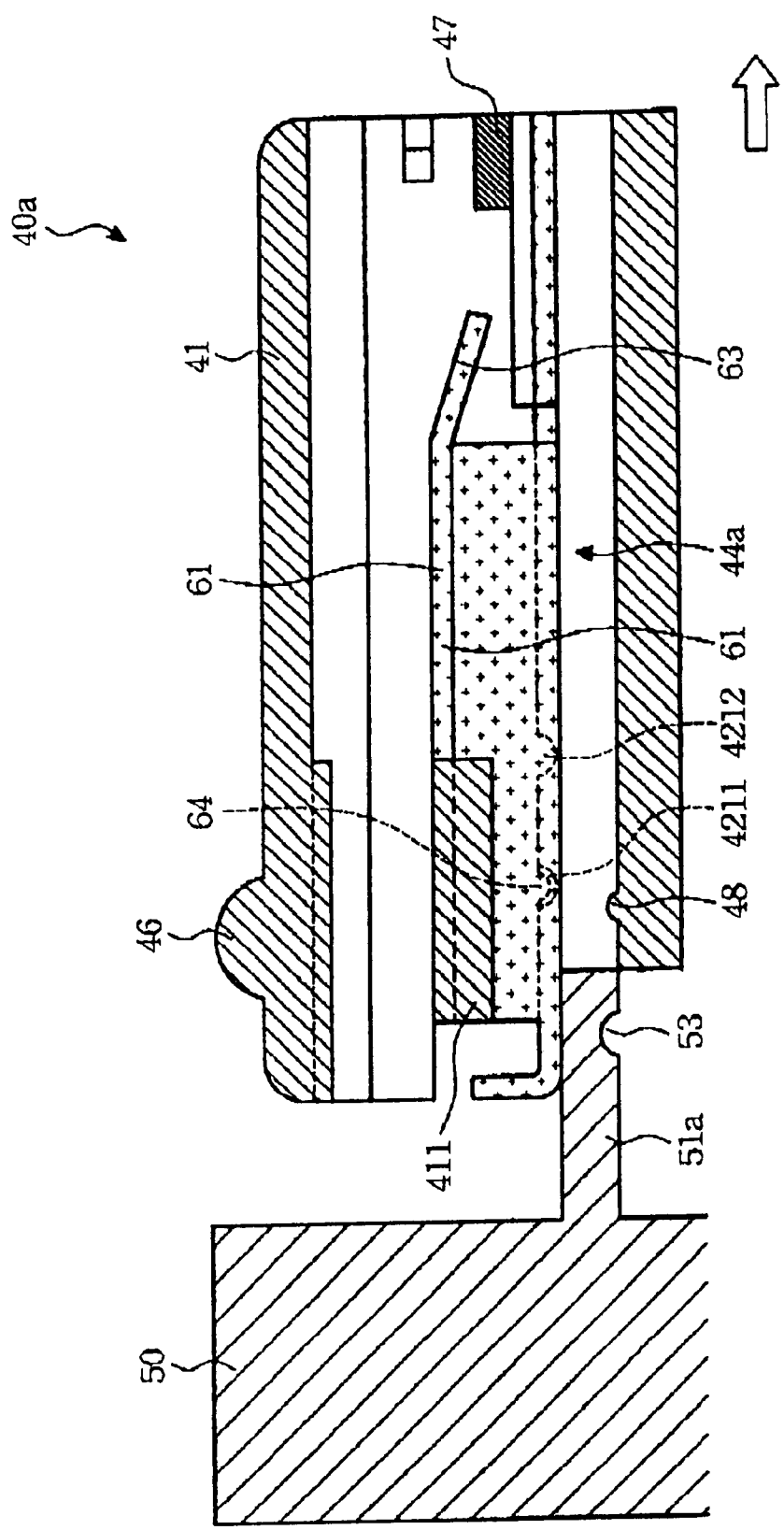
Figure 7F:
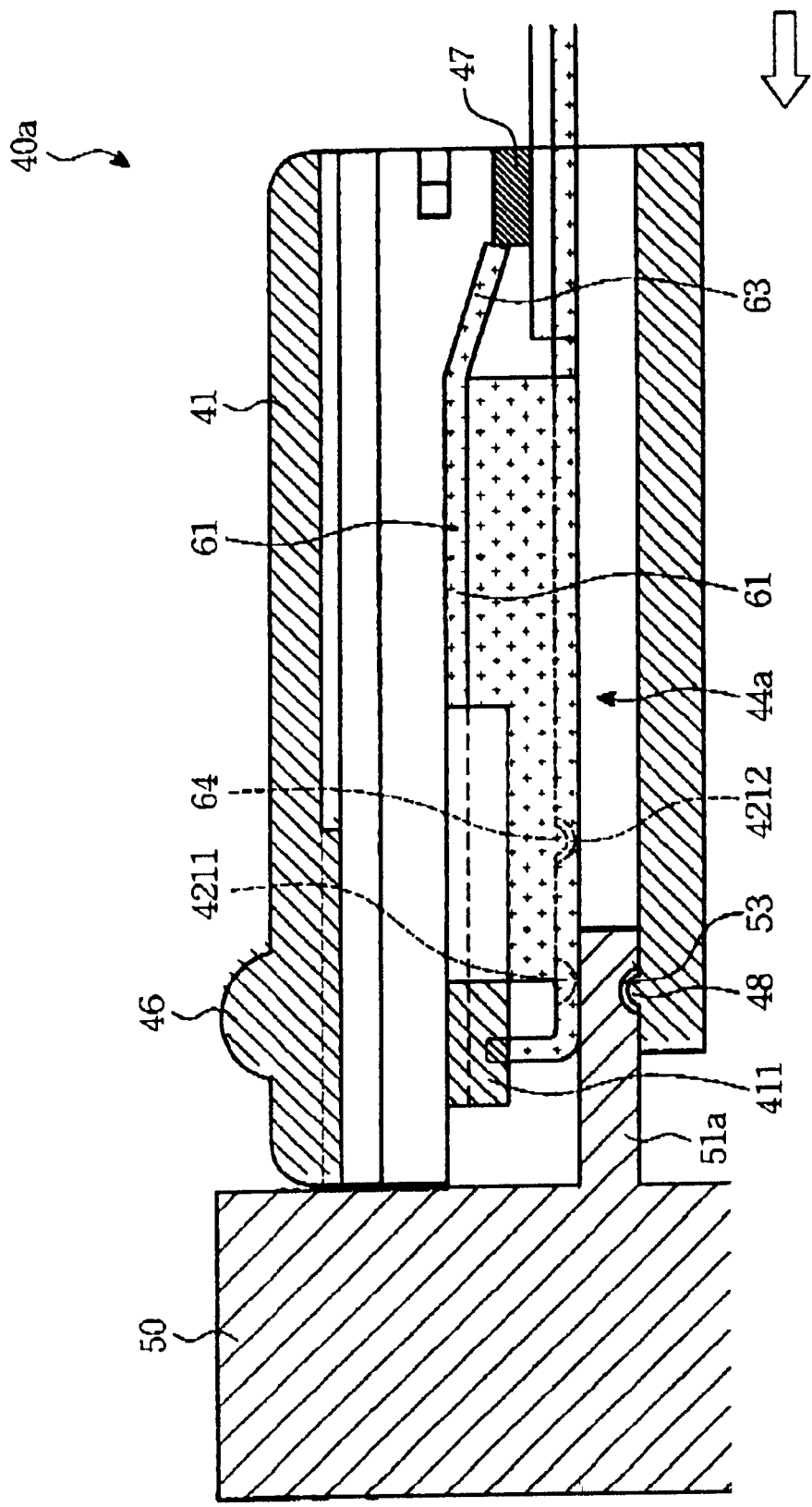
Figure 8A:
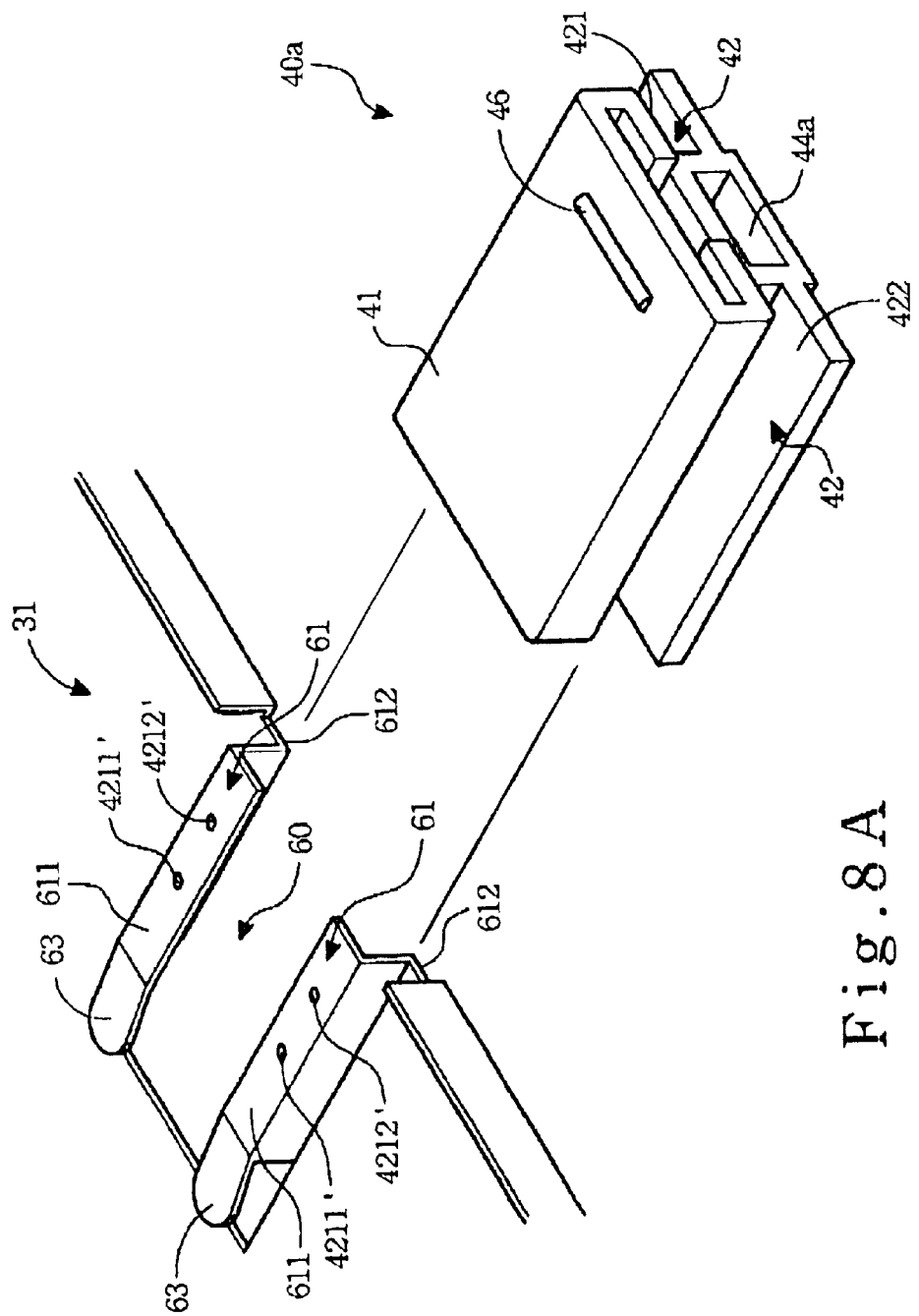
FIGS. 8A through 8F are additional schematic views of the third embodiment of the fastening mechanism.
Figure 8B:
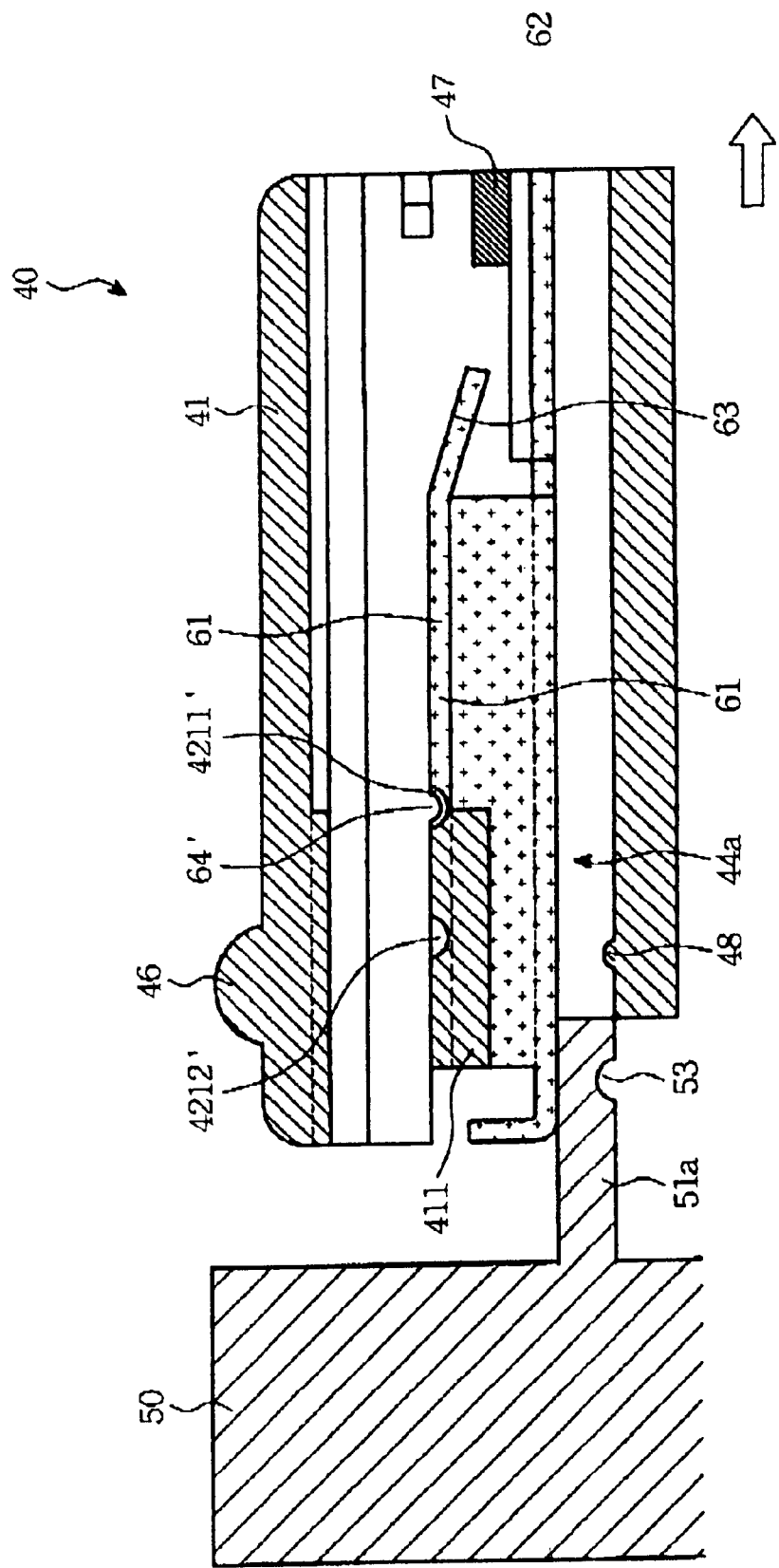
Figure 8C:
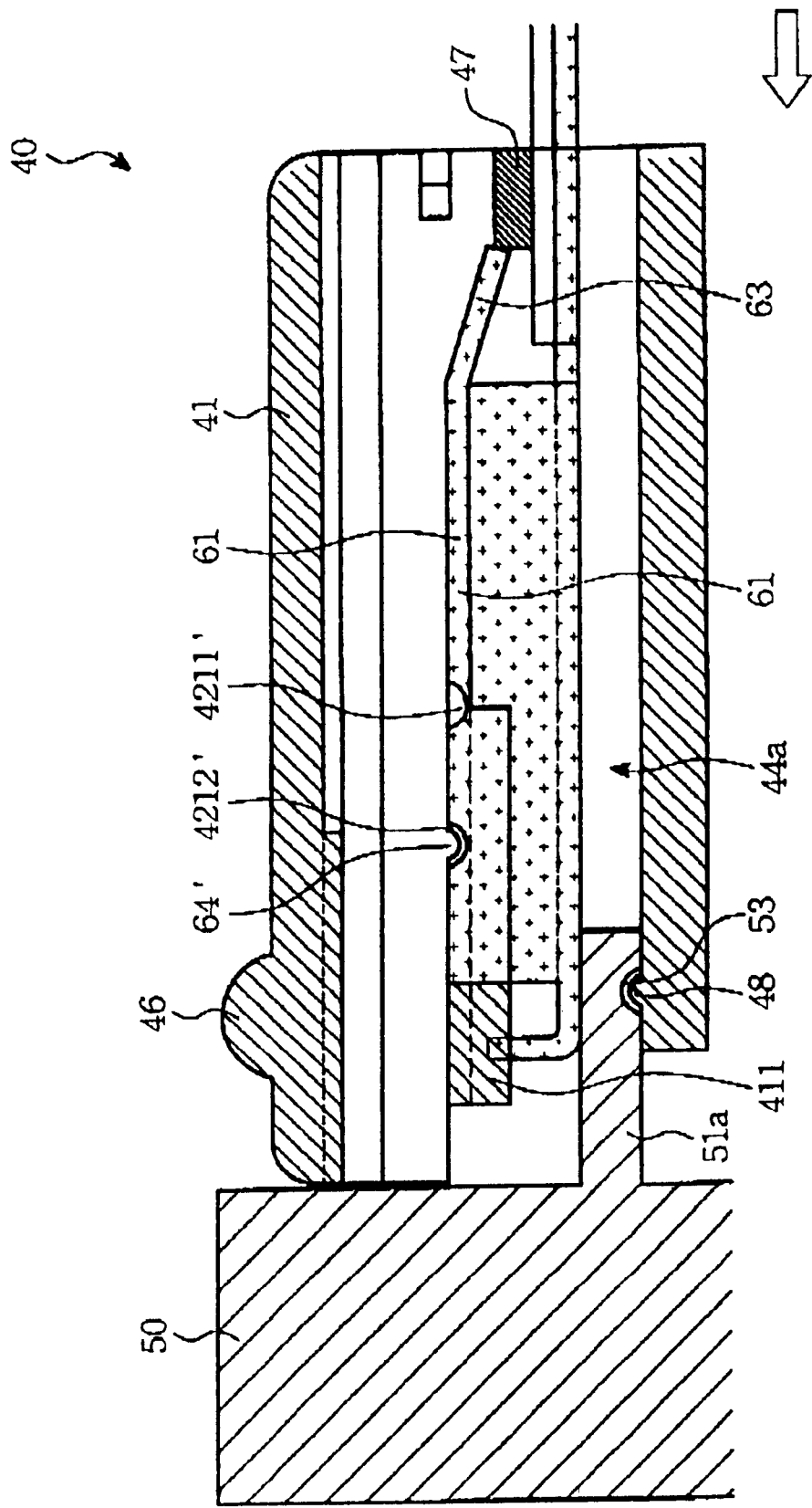
Figure 8D:
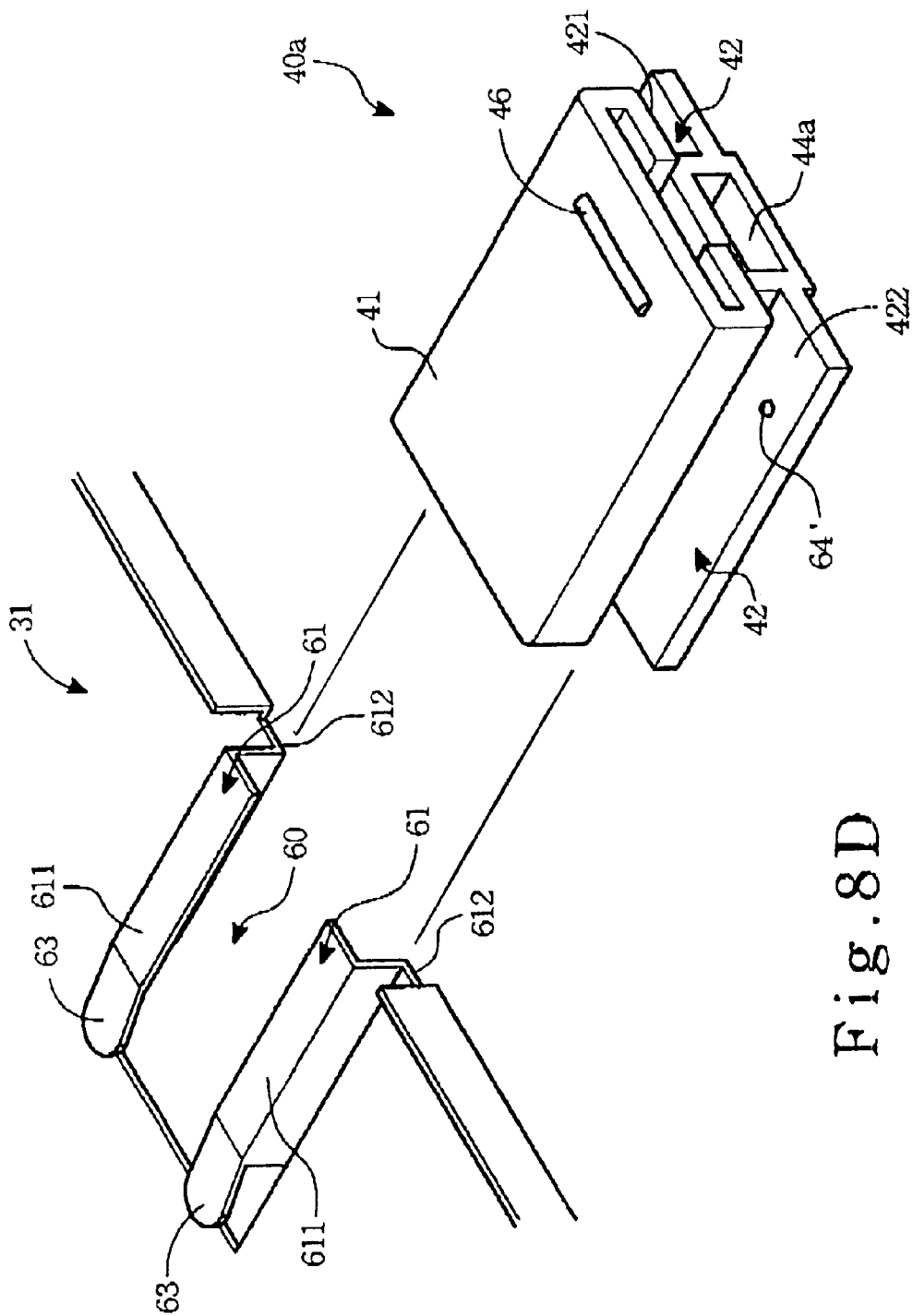
Figure 8E:
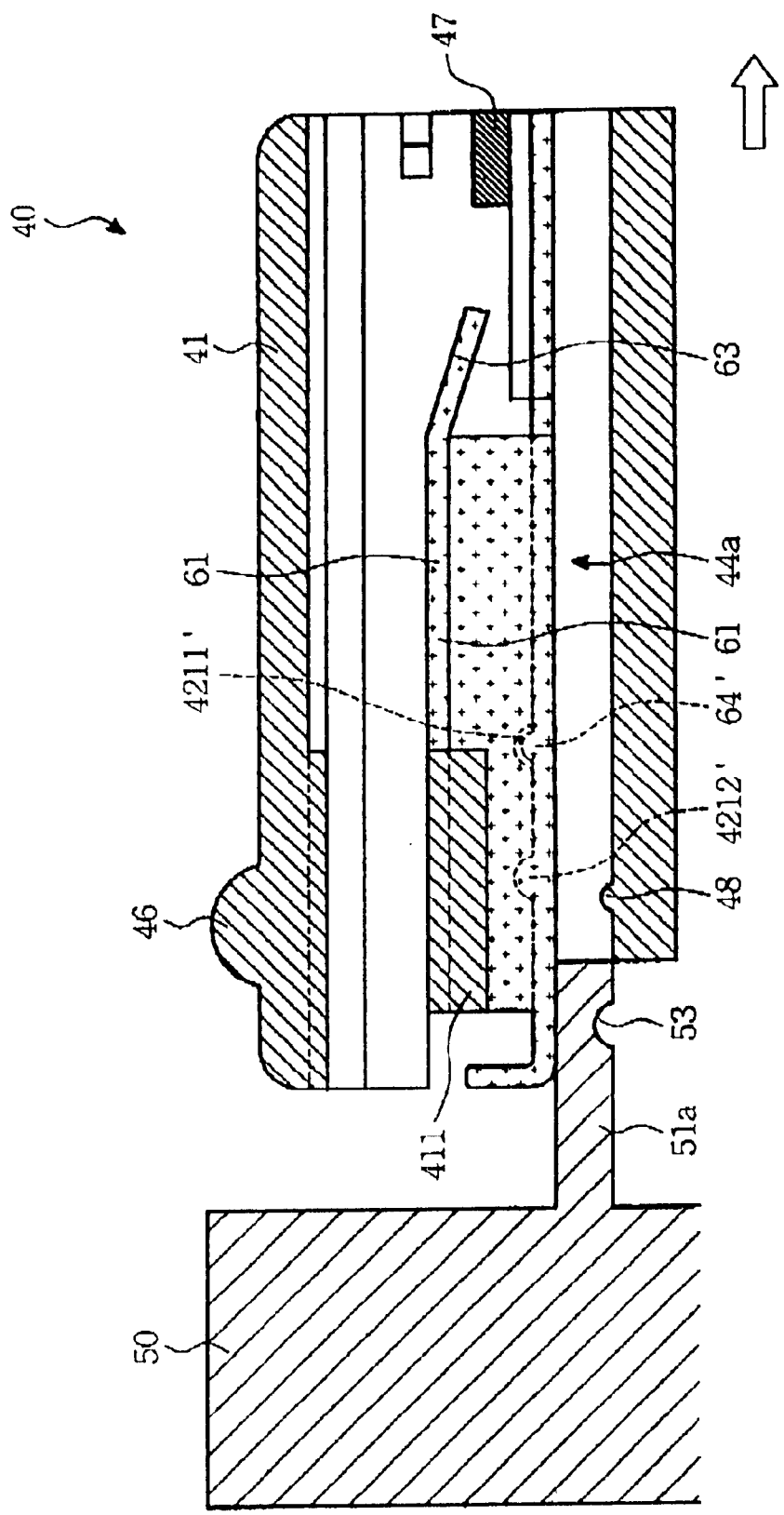
Figure 8F:
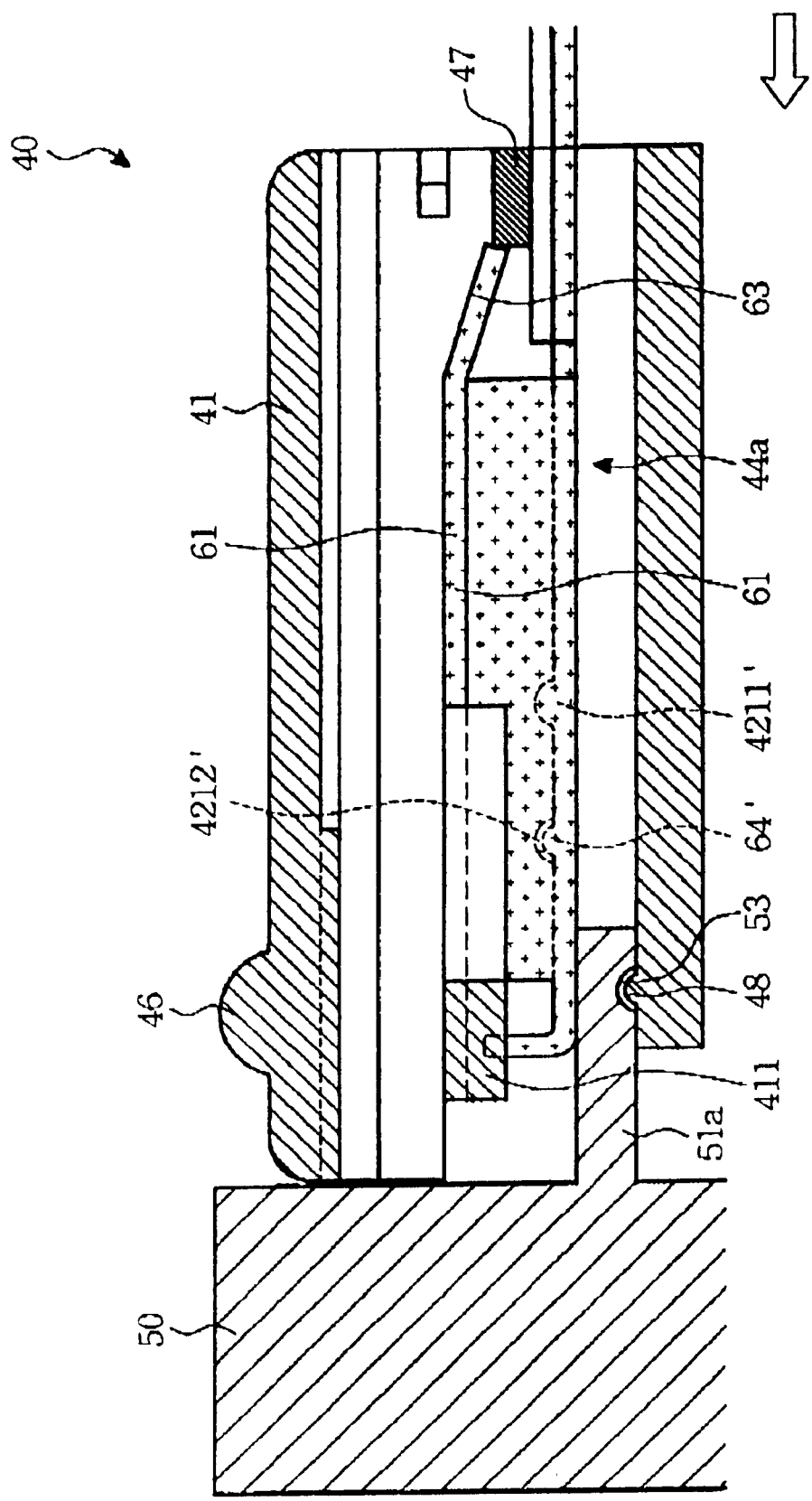

Referring to FIGS. 7B and 7C, in order to make the fastening between the fastening means 40a and computer casing 50 more secured, the fastening trough 44a at the front end of the body 41 may have a bulged spot 48 formed at the inside surface thereof, while the protrusive key 51a of the computer casing 50 has a dented spot 53 to mate against the bulged spot 48. Hence, when the fastening trough 44a engages with the protrusive key 51a, the bulged spot 48 will engage with the dented spot 53, in the mean time, the bulged spot 64 at the upper surface 611 will engage with the second dented spot 4212 at the slide-channel 42, thereby the fastening means 40a may be fastened securely with the computer casing 50. When the fastening trough 44a separates from the protrusive key 51a, the bulged spot 48 will also be separated from the dented spot 53, and the bulged spot 64 at the upper surface 611 will engage with the first dented spot 4211 at the slide-channel 42. Another alternative is to have the dented spot formed at the fastening trough 44a and the bulged spot formed at the protrusive key of the computer casing. The fastening method is substantially same as the one described above.

The biggest advantage of this embodiment is that the keyboard module has two fastening means which may be moved forwards or rearwards by single-handed to separately engage or detach the fastening trough of the keyboard module with the protrusive key of the computer casing. On the other hand, the first and second embodiment need two hands to hold the fastening means concurrently and to release when the fastening means is aimed at the protrusive keys to enable the protrusive key engaging with the fastening trough for the fastening means to engage or detach concurrently with the computer casing.

In summary, comparing with conventional techniques, this invention has the following advantages:

a. The fastening mechanism of this invention has a simpler structure. Assembly or mold-making is much easier than the conventional techniques. Hence the design and manufacturing costs may be reduced.

b. Operation of the fastening mechanism is easier for this invention than the conventional techniques. The keyboard module may be assembled on or detached from the computer casing easily and rapidly.

c. The fastening mechanism of this invention has a smaller size and occupies a smaller space on the keyboard module. It makes button key configuration and arrangement on the keyboard module easier.

While the preferred embodiments of the invention have been set forth for purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A fastening mechanism for detachable keyboard modules for fastening a keyboard module which has a base board to a first fastener located on a computer casing, the fastening mechanism comprising:

at least one fastening seat located at an edge of the base board, and having a closed end, the fastening seat further having:
  slides disposed on two sides of the fastening seat each having a ramp section tilted downwardly at a rear end thereof;
  a stopping flange located at the closed end; and
at least one fastening means slidably engaged with the fastening seat, having:
  a body having a second fastener located at a front end thereof and a housing chamber located at a rear end thereof;
  slide-channels located at two sides of the body slidably engaged with the slides and having a rear retainer located at a rear end thereof, such that, when the fastening means engages the fastening seat, the rear retainer is blocked by the ramp section preventing the fastening means from sliding out of the fastening seat; and
  an elastic element being restricted between the housing chamber and the stopping flange, and having elastic force to move the fastening means forwards to enable the second fastener engaging with the first fastener thereby fastening the keyboard module to the computer casing, when the fastening means receiving force and moved rearwards, the second fastener being separated from the first fastener and making the keyboard module separated from the computer casing.

2. The fastening mechanism of claim 1, wherein the slide has an upper surface and a lower surface, the slide channel having a downward channel surface and an upward channel surface, when the fastening means engaged with the fastening seat, the upper surface contact the downward channel surface and the lower surface contact the upward channel surface.

3. The fastening mechanism of claim 1, wherein the housing chamber further has a front retainer, when the fastening means engaged with the fastening seat, the elastic element pressing the front retainer with one end and pressing the stopping flange with another end.

4. The fastening mechanism of claim 1, wherein the second fastener is a fastening trough and the first fastener is a protrusive key mating against and engageable with the fastening trough to enable the keyboard module fastening to the computer casing.

5. The fastening mechanism of claim 1, wherein the second fastener is a protrusive key and the first fastener is a fastening trough mating against and engageable with the protrusive key to enable the keyboard module fastening to the computer casing.

6. The fastening mechanism of claim 1, wherein the slides and stopping flange are made of same material as the base board, and are formed by punching process.

7. The fastening mechanism of claim 1, wherein the fastening means is made of plastic material and is formed by injection forming process.

8. The fastening mechanism of claim 1, wherein the keyboard module has pseudo keys or insert slots located at the edges where the fastening means are absent for engaging with the computer casing.

9. A fastening mechanism for a detachable keyboard module for fastening the keyboard module which has a base board to a first fastener located on a computer casing, the fastening mechanism comprising:

at least one fastening seat located at an edge of the base board and having two slides located at two sides thereof, each side having a ramp section tilted downwards at a rear end thereof; and at least one fastening means slidably engaged with the fastening seat and moving between a first position and a second position, having:

a body having a second fastener located at a front end thereof; and two slide channels located at two sides of the body and slidably engaged with the slides respectively, each slide channel having a rear retainer located at a rear end thereof;

wherein when the fastening means is moved to the first position, the second fastener is engaged with the first fastener thereby fastening the keyboard module to the computer casing and the rear retainer is blocked by the ramp section for preventing the fastening means from sliding out of the fastening seat; when the fastening means is moved to the second position, the second fastener being separated from the first fastener and making the keyboard module separated from the computer casing.

10. The fastening mechanism of claim 9, each of the slides having an upper surface and a lower surface respectively, each of the slide channels having a downward channel surface and an upward channel surface, when the fastening means engaged with the fastening seat, the upper surface contact the downward channel surface and the lower surface contact the upward channel surface.

11. The fastening mechanism of claim 10, wherein the slide has a third fastener and the slide channel has a fourth fastener and a fifth fastener, when the fastening means is moved to the first position, the third fastener engaged with the fourth fastener; when the fastening means is moved to the second position, the third fastener engaged with the fifth fastener.

12. The fastening mechanism of claim 11, wherein the third fastener is a bulged/dented spot located at the upper surface of the slide, and the fourth and fifth fastener are dented/bulged spots located at the downward channel surface of the slide channel mating against the bulged/dented spot of the third fastener.

13. The fastening mechanism of claim 11, wherein the third fastener is a bulged/dented spot located at the lower surface of the slide, and the fourth and fifth fastener are dented/bulged spots located at the upward channel surface of the slide channel mating against the bulged/dented spot of the third fastener.

14. The fastening mechanism of claim 10, wherein the slide channel has a third fastener and the slide has a fourth fastener and a fifth fastener, when the fastening means is moved to the first position, the third fastener engaged with the fourth fastener; when the fastening means is moved to the second position, the third fastener engaged with the fifth fastener.

15. The fastening mechanism of claim 14, wherein the third fastener is a bulged/dented spot located at the upward channel surface of the slide channel, and the fourth and fifth fastener are dented/bulged spots located at the lower surface of the slide mating against the bulged/dented spot of the third fastener.

16. The fastening mechanism of claim 14, wherein the third fastener is a bulged/dented spot located at the downward channel surface of the slide channel, and the fourth and fifth fastener are dented/bulged spots located at the upper surface of the slide mating against the bulged/dented spot of the third fastener.

17. The fastening mechanism of claim 9, wherein the body has a horizontal bulged ridge located at the top surface thereof for moving the fastening means forwards or rearwards.

18. The fastening mechanism of claim 9, wherein the body has a second fastener located at a front end thereof in a form of a fastening trough which has a bulged spot located therein, the first fastener of the computer casing corresponding to the fastening tough having a protrusive key which has a dented spot mating and engaged with the bulged spot when the fastening trough engaged with the protrusive key to enable the keyboard module fastening to the computer casing securely.

* * * * *